(12) United States Patent
Sprainis et al.

(10) Patent No.: US 8,136,683 B2
(45) Date of Patent: Mar. 20, 2012

(54) COMBINATION YOKE AND ELASTOMERIC DRAFT GEAR

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US); David Meyer, Mt. Lebanon, PA (US); Michael Moriarity, Lansing, IL (US); Wajih Kanjo, Homer Glen, IL (US)

(73) Assignee: Wabtec Holding Corp, Wilmerding, PA (US)

( * ) Notice: Subject to any disclaimer, the term of this patent is extended or adjusted under 35 U.S.C. 154(b) by 118 days.

(21) Appl. No.: 12/150,777

(22) Filed: May 1, 2008

(65) Prior Publication Data

US 2008/0272081 A1 Nov. 6, 2008

Related U.S. Application Data

(60) Provisional application No. 60/926,987, filed on May 1, 2007.

(51) Int. Cl.
*B61G 9/00* (2006.01)
(52) U.S. Cl. ...... 213/40 R; 213/75 R; 213/45; 213/32 R
(58) Field of Classification Search ............ 213/22, 213/32 A, 32 R, 45, 47, 67 R, 68, 69, 70
See application file for complete search history.

(56) References Cited

U.S. PATENT DOCUMENTS

| | | | | |
|---|---|---|---|---|
| 761,795 | A * | 6/1904 | Townsend | 213/32 A |
| 1,852,486 | A * | 4/1932 | Sleeman | 213/32 R |
| 2,776,057 | A * | 1/1957 | Blattner | 213/46 R |
| 2,791,337 | A * | 5/1957 | Blattner | 213/45 |
| 2,801,010 | A * | 7/1957 | Willison | 213/45 |
| 2,817,445 | A * | 12/1957 | Campbell | 213/32 R |
| 2,858,030 | A * | 10/1958 | Mulcahy | 213/45 |
| 3,799,360 | A * | 3/1974 | Huml et al. | 213/22 |
| 3,840,126 | A * | 10/1974 | Domer | 213/45 |
| 4,095,065 | A * | 6/1978 | Akers | 200/400 |
| 4,198,037 | A * | 4/1980 | Anderson | 267/153 |
| 5,312,007 | A * | 5/1994 | Kaufhold et al. | 213/75 R |
| 5,351,844 | A * | 10/1994 | Carlstedt | 213/44 |
| 6,446,820 | B1 * | 9/2002 | Barker et al. | 213/75 R |
| 6,681,943 | B2 * | 1/2004 | Barker et al. | 213/75 R |
| 2005/0011852 | A1 * | 1/2005 | Fetterolf et al. | 213/75 R |
| 2008/0272079 | A1 * | 11/2008 | Sprainis et al. | 213/26 |
| 2008/0272081 | A1 * | 11/2008 | Sprainis et al. | 213/40 R |

FOREIGN PATENT DOCUMENTS

| | | |
|---|---|---|
| BE | 684015 | 12/1966 |
| DE | 1993283 | 9/1968 |
| FR | 1537310 | 8/1968 |

* cited by examiner

*Primary Examiner* — Joe Morano, IV
*Assistant Examiner* — Jason C Smith
(74) *Attorney, Agent, or Firm* — James Ray and Associates Intellectual Property, LLC (57) ABSTRACT

A draft gear assembly which is mountable within a yoke of the railway vehicle for cushioning buff and draft dynamic impact forces encountered during make-up and operation of a railway vehicle includes a compressible spring positioned intermediate the front coupler follower and the rear follower in alignment with the longitudinal axis of the yoke. A pair of axially aligned compressible springs may be also provided being either separated by a center plate or by a wall of the yoke.

23 Claims, 9 Drawing Sheets

COMBINATION YOKE AND ELASTOMERIC DRAFT GEAR

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,926 entitled "Plate For A Compressible Elastomeric Spring", to co-pending U.S. Ser. No. 12/150,928 entitled "Elastomeric Pad For A Compressible Elastomeric Spring", to co-pending U.S. Ser. No. 12/150,929 entitled "Method of Making Compressible Elastomeric Spring", to co-pending U.S. Ser. No. 12/150,808 entitled "Method Of Making Elastomeric Pad For A Compressible Elastomeric Spring", to co-pending U.S. Ser. No. 12/150,808 entitled "Combination Yoke and Elastomeric Draft Gear Having A Friction Mechanism", and to co-pending U.S. Ser. No. 12/150,927 entitled "Elastomeric Draft Gear Having A Housing", filed concurrently herewith. These applications are being assigned to the assignee of the present invention and the disclosures of these co-pending applications are hereby incorporated by reference thereto.

FIELD OF THE INVENTION

The present invention relates, in general, to draft gear assemblies for railway vehicles and, more particularly, this invention relates to a draft gear assembly having an elastomeric compressible spring installed within the yoke of the railway vehicle for cushioning dynamic impact forces that are usually encountered during make-up and operation of such railway vehicle.

BACKGROUND OF THE INVENTION

Draft gear assemblies employing compressible elastomeric springs are well known for cushioning buff and draft dynamic impact forces encountered during make-up and operation of a railway vehicle. Generally, the compressible elastomeric spring includes a stack of elastomeric pads separated by plates. The pads and plates are positioned transversely to the longitudinal central axis of the yoke and laterally within a hollow sill of the railway vehicle. Each pad is compressed along the longitudinal central axis toward the rear of the draft gear assembly to cushion the buff dynamic impact forces and is extended along the same longitudinal axis toward the front of the draft gear to at least cushion the draft dynamic impact forces. During pad compression and extension, each plate moves along the longitudinal central axis. The pad is manufactured from either a thermoset material such as rubber or from a thermoplastic copolyester material. Copolyester material manufactured by E.I. DuPont de Nemours & Co. of Wilmington, Del. under the general HYTREL trademark is a common material in the draft gear art.

As is further generally known, difficulty arises in maintaining lateral stiffness or stability of the elastomeric spring during cushioning of buff and draft dynamic impact forces. One common approach in maintaining such stability is to form each pad and plate with central apertures and pass a metal rod through all pads and plates. However, the use of the center rod increases the manufacturing costs of the draft gear.

Another common approach is to mount the elastomeric spring within draft gear housing and size the metal plates to abut the inner wall surfaces of the housing thus providing necessary axial guiding during compression of the elastomeric spring. However, the use of the housing increases the installation cost of such draft gears and reduces the carrying weight of the railway car due to weight of the housing.

A combination of the center rod and the housing is also employed with or without edge guiding for maintaining lateral stability of the elastomeric spring. Since there is a continuing desire to increase loading capacity of each railcar, the weight associated with the housing and/or rod adversely affects such loading capacity.

Furthermore, such continuing desire for increased loading capacity adds to dynamic impact loads experienced by the energy absorbing assemblies during operation and makeup of the train consist. Consequently, such higher dynamic impact loads are directly transferred to the compressible elastomeric spring mounted within the draft gear housing. Moreover, it has been known to exceed mandated maximum speeds during makeup of the train consist which further increases the dynamic impact loads to be absorbed and cushioned by various draft gear assemblies.

Prior to the conception and design of the present invention, efforts have been made to provide protection for higher dynamic impact loads present during "humping" of the individual railcars in the yard to build a train consist wherein one railcar is pushed over the hump toward another awaiting railcar and wherein such railcar can travel at speeds exceeding the AAR speed limit of 2 to 4 MPH. U.S. Pat. No. 6,446,820 issued to Barker et al. discloses one type of such draft gear assembly which has a yoke, a coupler follower, a rear follower, a front resilient member and a back resilient member. The yoke has top and bottom stops. The coupler follower is biased against the yoke top and bottom stops. The draft gear assembly also includes a center rod that extends through the yoke, through the back resilient member and through the rear follower. However, it has been found that during repetitive use, the center rod is not sufficient to maintain axial alignment of the back resilient member resulting in loss of lateral stability of pads and plates and further resulting in decreased performance and decreased reliability of the draft gear assembly. It has been further found that this draft gear assembly does not resist overcompression of the back resilient member further resulting in decreased reliability and increased maintenance costs.

Other existing draft gear assemblies eliminate the need for the housing by adapting the plates to abut the inner vertical wall surface of the center sill, however this approach is not desirable by some railway vehicle operators due to wear concerns of the sill wall surfaces or additional installation cost due to wear members secured to guiding edges of each plate.

Therefore, there is a continuing need for an inexpensive and reliable draft gear assembly employing a compressible elastomeric spring and capable of absorbing high dynamic impact loads without the use of the center metal rod or the housing for guiding purposes.

SUMMARY OF THE INVENTION

The present invention overcomes disadvantages of the prior art devices by providing a novel draft gear assembly for cushioning buff and draft dynamic impact forces encountered during make-up and operation of a railway vehicle. In accordance with one aspect of the present invention, the draft gear assembly includes an elongated yoke removably mountable within a hollow center sill of a railway vehicle body. The yoke has a yoke head which is adapted to connect to an end of a coupler shank, a butt end axially opposing the yoke head, a pair of elongated, substantially parallel spaced-apart top and bottom strap members each having an inner-surface, an outer surface, a front end and a rear end, the rear end of each strap member being joined to the butt end of the yoke and the front end of each strap member being joined to the yoke head. A rear follower is positioned intermediate the top and the bottom strap members transversely to a longitudinal central axis of the yoke. The rear follower is sized to abut a draft gear seat formed within the butt end of the yoke and a pair of rear stops secured to the center sill when the draft gear assembly is in a position to cushion the buff dynamic impact forces. A front coupler follower is also provided. The front coupler follower is positioned intermediate the top and the bottom strap members transversely to the central axis of the yoke. The front coupler follower is sized to abut a pair of front stops formed in a striker casing engaging the center sill when the draft gear assembly is in a position to cushion the draft dynamic impact forces. An elongated compressible elastomeric spring is positioned intermediate the front coupler follower and the rear follower in axial alignment with the central axis of the yoke. The compressible elastomeric spring includes a stack having a predetermined plurality of elastomeric pads separated by a predetermined plurality of plate like members. Each of the predetermined plurality of elastomeric pads and each of the predetermined plurality of plate like members is positioned transversely to the central axis of the yoke and laterally within the center sill. Each of the predetermined plurality of elastomeric pads is compressed along the central axis toward the rear follower to cushion the buff dynamic impact forces and is compressed along the central axis toward the front coupler follower to cushion the draft dynamic impact forces. Each of the predetermined plurality of plate like members moves along the longitudinal axis during cushioning of the buff and draft dynamic impact forces.

In accordance with another aspect of the present invention, the draft gear assembly includes a pair of elongated compressible springs positioned intermediate the front coupler follower and the rear follower in alignment with the longitudinal axis of the yoke. A center plate is positioned between inner ends of each elongated compressible spring.

In accordance with yet another aspect of the present invention, the draft gear assembly includes a yoke having a back wall, a top wall extending from the back wall toward a front end of the draft gear assembly, and a bottom wall extending from the back wall toward the front end of the draft gear assembly. A front coupler follower is positioned between the back wall of the yoke and the front end of the draft gear assembly. The front coupler follower has a pair of stop contact surfaces for contact with the draft sill front stops and a coupler bearing surface between the stop contact surfaces. A front compressible resilient member is positioned between the coupler follower and the back wall of the yoke. A back compressible resilient member is positioned between the yoke back wall and a back end of the draft gear assembly. At least one of the front compressible resilient member and the back compressible resilient member includes a predetermined plurality of elastomeric pads disposed coaxially and in series with each other. Each of the predetermined plurality of pads has a peripheral side surface and a pair of axial ends. Each of the pair of axial ends has a flat surface thereof disposed normal to the central axis. A predetermined plurality of separator plate like members are provided with each separator plate like member disposed between a pair of the pads. Each separator plate like members has a first flat surface thereof abuttingly engaging a flat end surface of one pad and an opposed second flat surface thereof abuttingly engaging a flat end surface of an adjacent pad. The predetermined plurality of pads and separator plates form in combination a multi-tiered stack having a central longitudinal axis and a predetermined initial height. Each of the predetermined plurality of pads compresses and extends along the central axis during cushioning of the buff and draft dynamic impact forces causing movement of each of the predetermined plurality of separator plates along the central axis. An axial aperture is formed through the each of the predetermined plurality of separator plate like members concentric with the central axis of the stack. There is means which is secured to the each of the predetermined plurality of separator plate like members and positioned on a peripheral edge of the axial aperture for mechanically interlocking each of the predetermined plurality of separator plate like members with each of the pair of pads. A rear follower is positioned rearward of the back resilient member. Finally, means is provided for attaching a rear end of the back resilient member to an inner surface of the rear follower.

In accordance with a further aspect of the present invention, there is provided a follower block in combination with a draft gear assembly mountable within a yoke of the railway vehicle for cushioning buff and draft dynamic impact forces encountered during make-up and operation of a railway vehicle. The daft gear assembly includes at least one elastomeric compressible spring mounted axially within the yoke. The follower block includes an inner surface which abuttingly engages an end of the elastomeric compressible spring. A rear surface of the follower block is sized for abuttingly engaging at least one of rear stops, front stops and an end of a coupler shank. Means is also provided for locating the end of the elastomeric compressible spring thereon. The locating means being at least one of prongs, projections, apertures and threaded apertures.

OBJECTS OF THE INVENTION

It is, therefore, one of the primary objects of the present invention to provide a draft gear assembly for cushioning buff and draft dynamic impact forces encountered in operation of a railway vehicle.

Another object of the present invention is to provide a railway draft gear assembly that employs compressible elastomeric spring.

Yet another object of the present invention is to provide a railway draft gear assembly that employs a compressible elastomeric spring having mechanically interlocked elastomeric pads and metal plates.

A further object of the present invention is to provide a railway draft gear assembly that employs a compressible elastomeric spring mounted axially within the yoke of the railcar between the front coupler follower and the rear follower.

Yet a further object of the present invention is to provide a railway draft gear assembly that employs a compressible elastomeric spring mounted axially within the yoke of the railway car and connected at each end thereof to front coupler follower and the rear follower respectively.

An additional object of the present invention is to provide a railway draft gear assembly that employs a pair of compressible elastomeric springs mounted axially within the yoke of the railcar between the front coupler follower and the rear follower and which are separated by a center plate.

Another object of the present invention is to provide a railway draft gear assembly that employs a front compressible elastomeric spring mounted within the yoke and a rear compressible elastomeric spring mounted between the yoke and the rear follower.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a railway vehicle applies but is not limited to passenger railcar, freight railcar, locomotive and the like railway vehicles.

The best mode for carrying out the invention is presented in terms of its various embodiments, herein depicted within FIGS. 1 through 9. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only several particular configurations shall be shown and described for purposes of clarity and disclosure and not by way of limitation of scope.

The present invention provides a draft gear assembly for cushioning buff and draft dynamic impact forces encountered during make-up and operation of a railway vehicle which is not shown but which is well known in the art. Furthermore, the draft gear assembly is mounted in combination with a conventional yoke, generally designated as 20, between a rear follower block 50 and a front coupler follower block 60. As is conventional, the yoke 20 is removably mounted within a hollow center sill 2 of a railway vehicle body (not shown).

Figure 1:
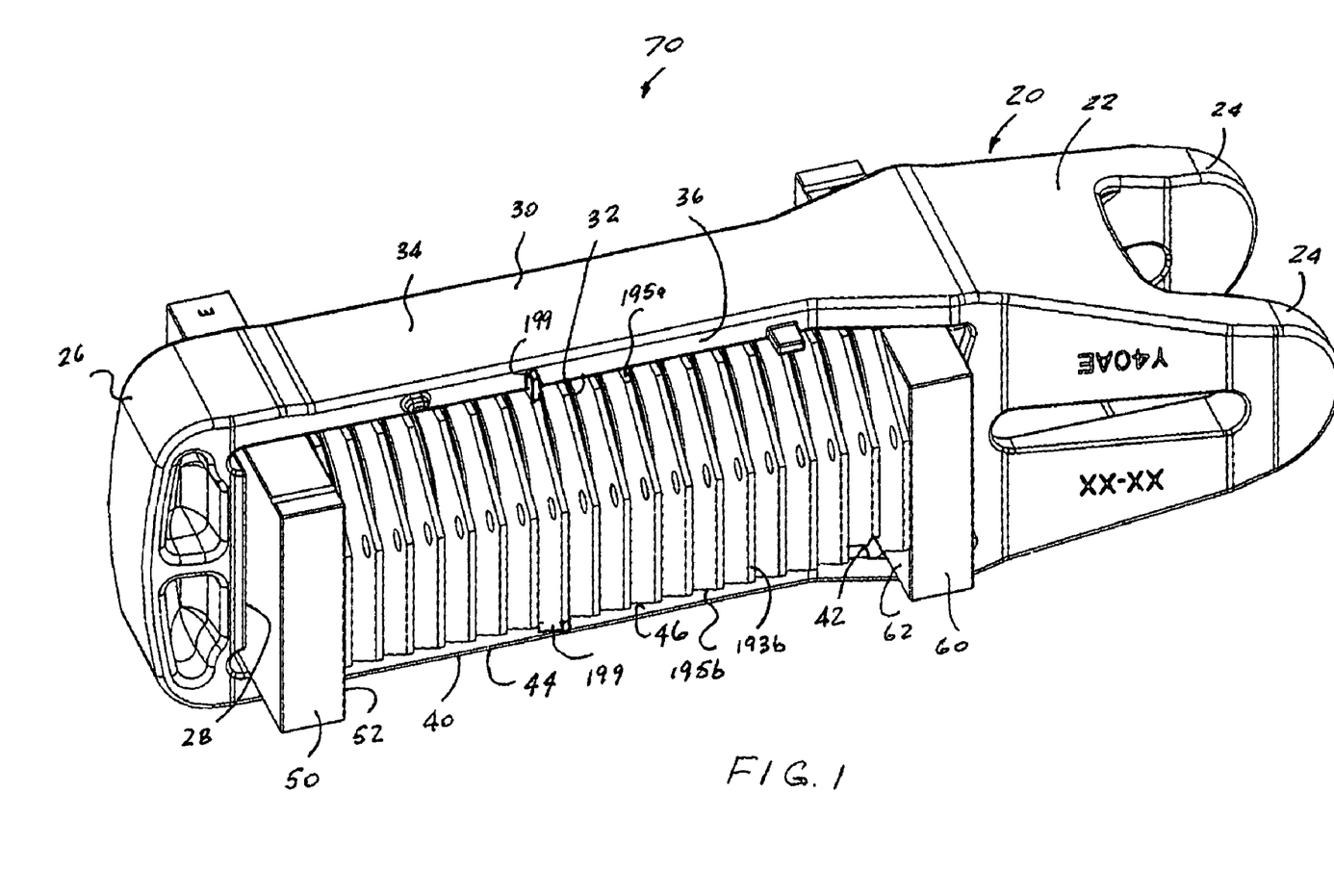
FIG. 1 is an isometric view of a draft gear assembly which is constructed in accordance with one embodiment of the invention.

The yoke 20 is illustrated as a conventional yoke for standard AAR E-type couplers, for example as disclosed in U.S. Pat. No. 4,095,065 issued to Elliott et al. and whose teachings are incorporated into this document by reference thereto. Briefly, the yoke 20 includes a yoke head 22 having a pair of keyslot walls 24. A butt end 26 of the yoke 20 axially opposes the yoke head 22 and has a conventional draft gear seat 28 formed therein. There is an elongated top strap member 30 which is disposed, in a conventional manner, between the yoke head 22 and the butt end 26. The top strap member 30 has a horizontally disposed flat inner surface 32, a horizontally disposed outer surface 34 and a pair of vertically disposed side edges 36, only one of which is shown in FIG. 1. There is also an elongated bottom strap member 40 which is disposed, in a conventional manner, between the yoke head 22 and the butt end 26 and which is spaced apart from the top strap member 30 in a substantially parallel manner. Similarly, the bottom strap member 40 has a horizontally disposed flat inner surface 42, a horizontally disposed outer surface 44 and a pair of vertically disposed side edges 46, only one of which is shown in FIG. 1.

As is also conventional in the art, the rear follower 50 is positioned intermediate the top and the bottom strap members, 30 and 40 respectively, and transversely to a longitudinal central axis 21 of the yoke 20. The rear follower 50 is sized to abut the seat 28 of the yoke 20 and a pair of rear stops 3 secured to the center sill 2 when the draft gear assembly 70 is in a position to cushion the buff dynamic impact forces.

The front coupler follower 60 is also positioned intermediate the top and the bottom strap members, 30 and 40 respectively and transversely to the central axis 21 of the yoke 20. The front coupler follower 60 is sized to abut a pair of front stops 8 which are formed on a rear portion 6 of the striker casing 5 engaging the center sill 2 when the draft gear assembly 70 is in a position to cushion the draft dynamic impact forces. The front coupler follower 60 further abuts the shank 12 of the coupler 10 in a conventional manner.

Now in reference to FIGS. 1-4 and in accordance with one embodiment of the invention, a draft gear assembly, generally designated as 70, is provided and includes pluralities of compressible elastomeric pads and plates which are interposed therebetween and which are positioned intermediate the rear coupler 50 and the front follower coupler 60 for absorbing and cushioning buff and draft dynamic impact forces applied to the draft gear assembly 70 through the coupler shank 12.

Preferably, such pluralities of pads and plates form an elongated compressible elastomeric spring, generally designated as 102, which is disclosed in a co-pending U.S. Ser. No. 12/150,809 entitled "Compressible Elastomeric Spring" filled concurrently therewith. It is further presently preferred to provide the plates as disclosed in the co-pending U.S. Ser. No. 12/150,926 "Plate For A Compressible Elastomeric Spring" and provide the elastomeric pads as disclosed in the co-pending U.S. Ser. No. 12/150,926 entitled "Elastomeric Pad For A Compressible Elastomeric Spring". Thus, for the sake of brevity, the detail description of pads, plates and attachment means therebetween within the spring 102 will be omitted in this application. Briefly, the compressible elastomeric spring 102 includes the predetermined plurality of pads 110 and separator plate like members 190 which form in combination a multi-tiered stack having a predetermined initial height, and whereby each of the predetermined plurality of pads 110 compresses and extends along the central axis 21 causing movement of each of the predetermined plurality of separator plate like members 190 along the central axis 21 during cushioning of the buff and draft dynamic impact forces. To employ the compressible elastomeric spring 102, the draft gear assembly 70 further includes means for maintaining axial alignment of the compressible elastomeric spring 102 during cushioning of buff and draft dynamic impact forces and an attachment means for attaching in a bonding-free manner abutting surfaces of the each pad 110 and each separator plate like member 190.

The present invention contemplates that the axial alignment maintaining means may include the axial aperture 180 formed through each of the predetermined plurality of separator plate like members 190 and a plurality of first prongs 170a and second prongs 170b positioned on or in close proximity to the peripheral edge of the axial aperture 180.

The axial alignment maintaining means may further include a first groove 140 formed within a surface of the first axial end of the each pad 110 and a second groove 140 formed within a surface of the second axial end of such pad 110, wherein each of the predetermined plurality of first prongs 170a are received within the first groove 130, and wherein each of the predetermined plurality of second prongs 170b are received within the second groove 140.

The axial alignment maintaining means may additionally include a pair of projections 130 at least one of formed integrally with a respective axial end of the each pad 110 and secured to the surface thereof, and wherein each of the pair of projections 130 extends into a respective axial aperture 180 of an abuttingly positioned separator plate like member 190 and is sized for frictional engagement with a respective predetermined plurality of prongs 170a, 170b.

It has been found that in order to provide presently desired protection for higher dynamic impact loads while reducing the weight and costs of the draft gear assembly 70 as well as eliminating sill wear concerns, the axial alignment means should include in combination, the prongs 170a, 170b having a predetermined with and disposed generally perpendicular to the surface of the plate 190, axial aperture 180, projections 130 formed on each axial end of the pad 110 and frictionally engaged with respective prongs 170a, 170b as well as extending into the axial aperture 180 and grooves 140 sized to receive the respective prongs 170a, 170b therewithin.

However, the present invention contemplates that the alignment maintaining means may include each of the predetermined plurality of separator plate like members having each vertical side edge 193a, 193b thereof positioned in abutting relationship with a respective inner vertical surface 2 of the center sill 2. In operation, such vertical side edges 193a, 193b will provide peripheral guidance for operation of the spring 102. When it is desirable to reduce wear of the inner vertical surfaces 2 and vertical side edges 193a, 193b, such edges 193a, 193b positioned in close proximity to the respective inner vertical surface 4 and a wear member 198 will be secured in a conventional manner to each vertical edge 193a, 193b of at least one separator plate like member 190.

Moreover, the present invention contemplates that the alignment maintaining means may include at least a pair of members 199 secured to at least one separator plate like member 190 and extending outwardly beyond each horizontal edge 195a, 195b for abutting engagement with a respective side edge 36, 46 of a respective one of the top and bottom straps 30, 40. In operation such at least pair of members 199 will cage a respective strap 30, 40 therebetween and provide guidance during compression and extension of the pads 110. One of such pair of members 199 may be formed as a pair of vertically spaced flanges integral with at least one separator plate like member 190 for ease of manufacturing while still enabling installation of the spring 102 into the yoke 20.

Depending on the application and absorbing capacity requirements for the draft gear assembly 70, the peripheral guidance by way of vertical edges 193a, 193b and/or members 198, 199 may be also provided in combination with the prongs 170a, 170b.

It is also within the scope of the present invention to provide a locating means for locating the rear each end of the compressible elastomeric spring 102 on an inner surface 52 of the rear follower 50. The specific arrangement of these locating means will depend on the specific application and on the construction of the spring 102. By way of an example of FIG. 3, when the spring 102 is provided without the end plate members 150, thus having the pad 110 exposed, prongs 170 may be disposed on the inner surface 52 of the rear follower 50 which is then rigidly secured to the spring 102 during the forming process thereof, thus providing for one-piece assembly that can be simply installed into the yoke 20. The prongs 170 may be formed integrally with the rear follower 50 or rigidly secured to the inner surface 52 thereof, for example by a welding method when the rear follower 50 is manufactured from a conventional metallic material, such as steel.

Figure 3:
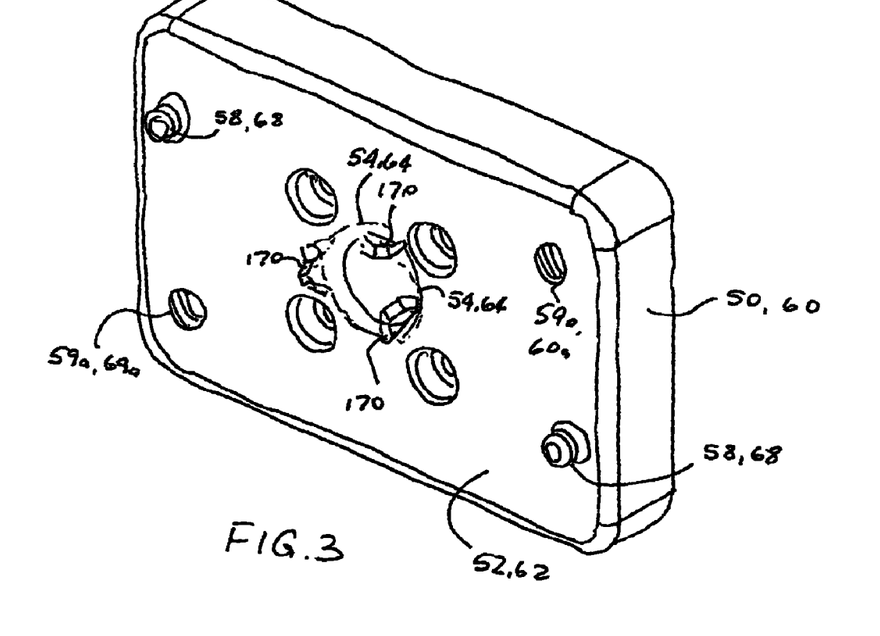
FIG. 3 is an isometric view of a rear or front follower employed with the draft gear assembly of FIG. 1 and which is constructed in accordance with one embodiment of invention.
Figure 4:
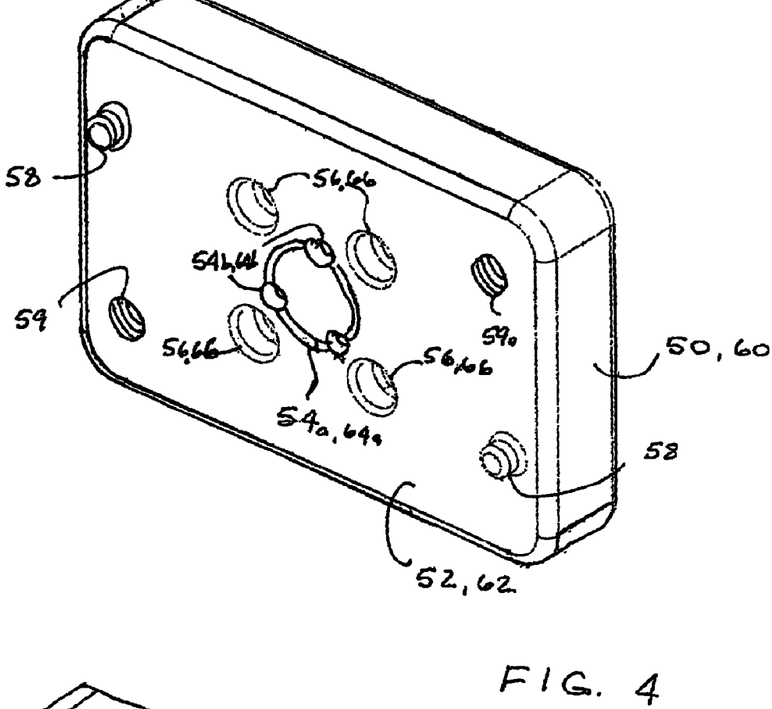
FIG. 4 is an isometric view of a rear or front follower employed with the draft gear assembly of FIG. 1 and which is constructed in accordance with another embodiment of invention.

By way of another example of FIGS. 3-4, the rear follower 50 may be provided with a central bore 54 formed on the inner surface 52 thereof and sized for receiving the projection 130 of the end pad 110 or provided with the central bore 54a sized for at least receiving the prongs 170a, 170b of such plate like member 190. It will be appreciated that the central bore 54a may be replaced by a groove 54a, 64a or by a plurality of small bores 54b, 64b for receiving the prongs 170a, 170b. By way of yet another example of FIGS. 3-4, a plurality of bores 56 may be formed on the inner surface 52 for operatively receiving the projections 160a, 160b provided on the plate like member 190. By way of a further example of FIGS. 3-4, a pair of projections 58 may be formed on or secured to the inner surface 52 for operative engagement with a pair of alignment apertures 188 provided in the plates 150, 190. Additionally, threaded apertures or bores 59a may be also provided on the inner surface 52 with complimentary apertures formed through end members 150, 190 in alignment with the threaded apertures or bores 59a formed within the rear coupler 50 enabling secure attachment of the compressible elastomeric spring 102 to the rear follower 50 with fasteners 218, best shown in FIGS. 5 and 7. Advantageously, at least a pair of alignment apertures 188 may be provided in such end members 150, 190 or other apertures may be provided as well. A combination of projections 58 received within the apertures 188 and threaded bores 59a may be also employed.

For the sake of brevity, it would be understood that the front coupler follower 60 may be provided with the above described elements for locating the front end of the spring 102 on an inner surface 62 thereof.

Figure 10:
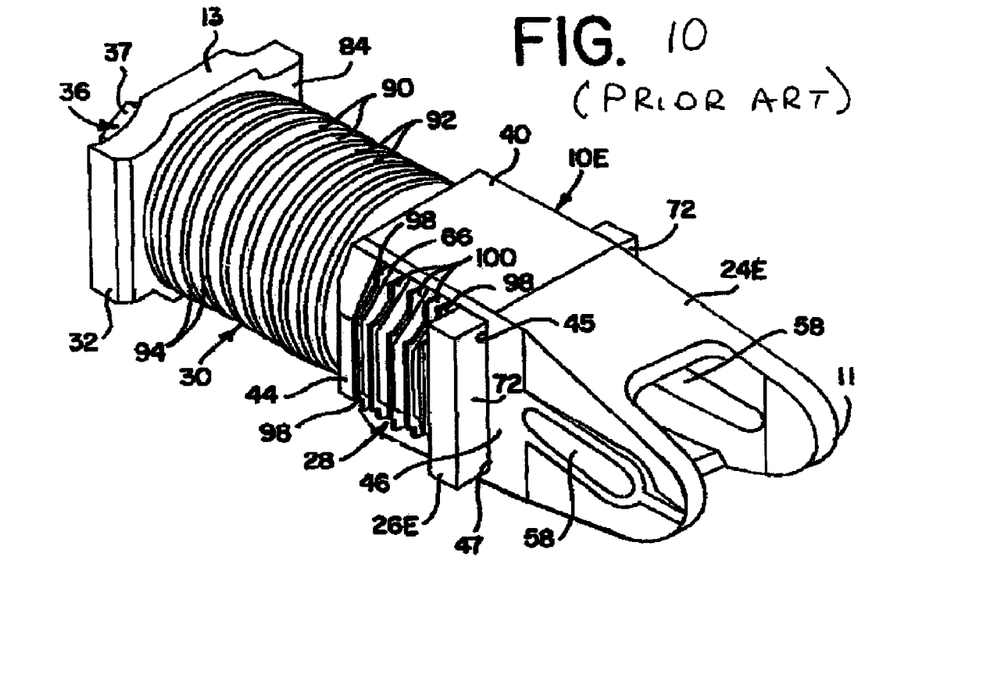
FIG. 10 is a front isometric view of a prior art draft gear assembly.
Figure 11:
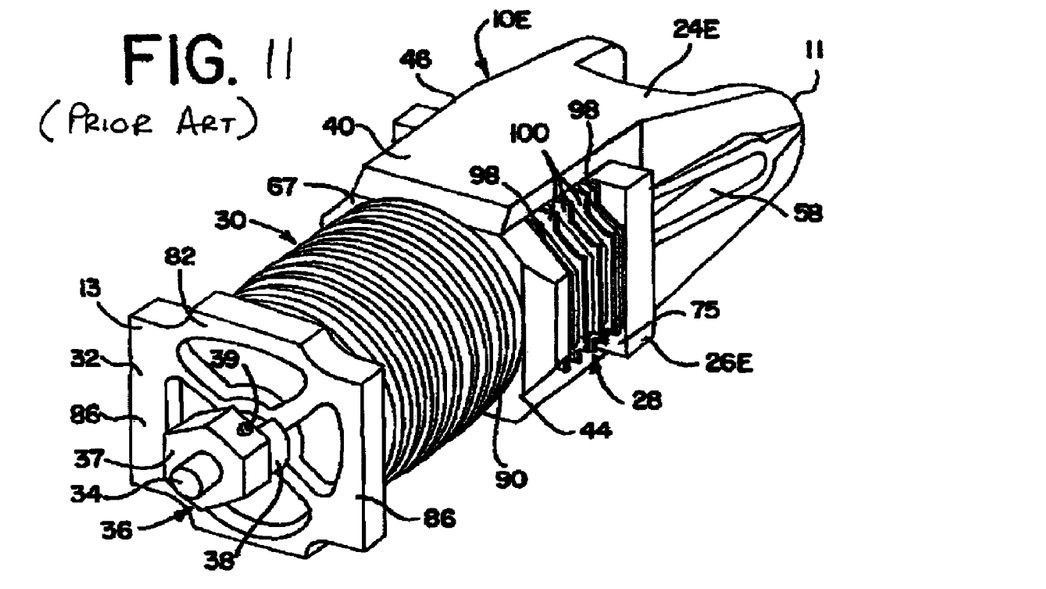
FIG. 11 is a rear isometric view of the draft gear assembly of FIG. 10.

Comparative testing of the draft gear assembly 70 of FIG. 1-4 of the present invention, employing the protrusions 160a, 160b, prongs 170a, 170b, projections 130 and grooves 140, with the draft gear assembly disclosed in U.S. Pat. No. 6,446, 820 issued to Barker, which is commonly known as a "Twin Pack" and which is labeled as prior art in FIGS. 10-11, resulted in improved performance of the draft gear assembly 70 of the present invention during cushioning of buff and draft dynamic impact forces. More importantly, the testing unexpectedly showed a greater than expected performance improvement. By way of one example of FIG. 8, when comparing the Energy Input (energy applied to the draft gear assembly) versus the Reaction Force exhibited by the draft gear during cushioning of the applied energy, the performance of the draft gear assembly 70 of the present invention, (line 214*a*), provided about 200 percent performance improvement at a maximum reaction force over the performance of the Twin Pack (line 214*b*). By way of another example of FIG. 9, the draft gear assembly 70 of the present invention (loop 216*a*) was capable of absorbing impact forces with about 30 percent reduction in travel as compared with the Twin Pack (loop 216*b*). It has been assessed that the axial alignment and correlating lateral stability of the spring 102 enabled by a novel attachment of the plate like member 150, 190 to the elastomeric pad 110 and material of the elastomeric pad 110 contributed to such performance improvement.

Figure 5:
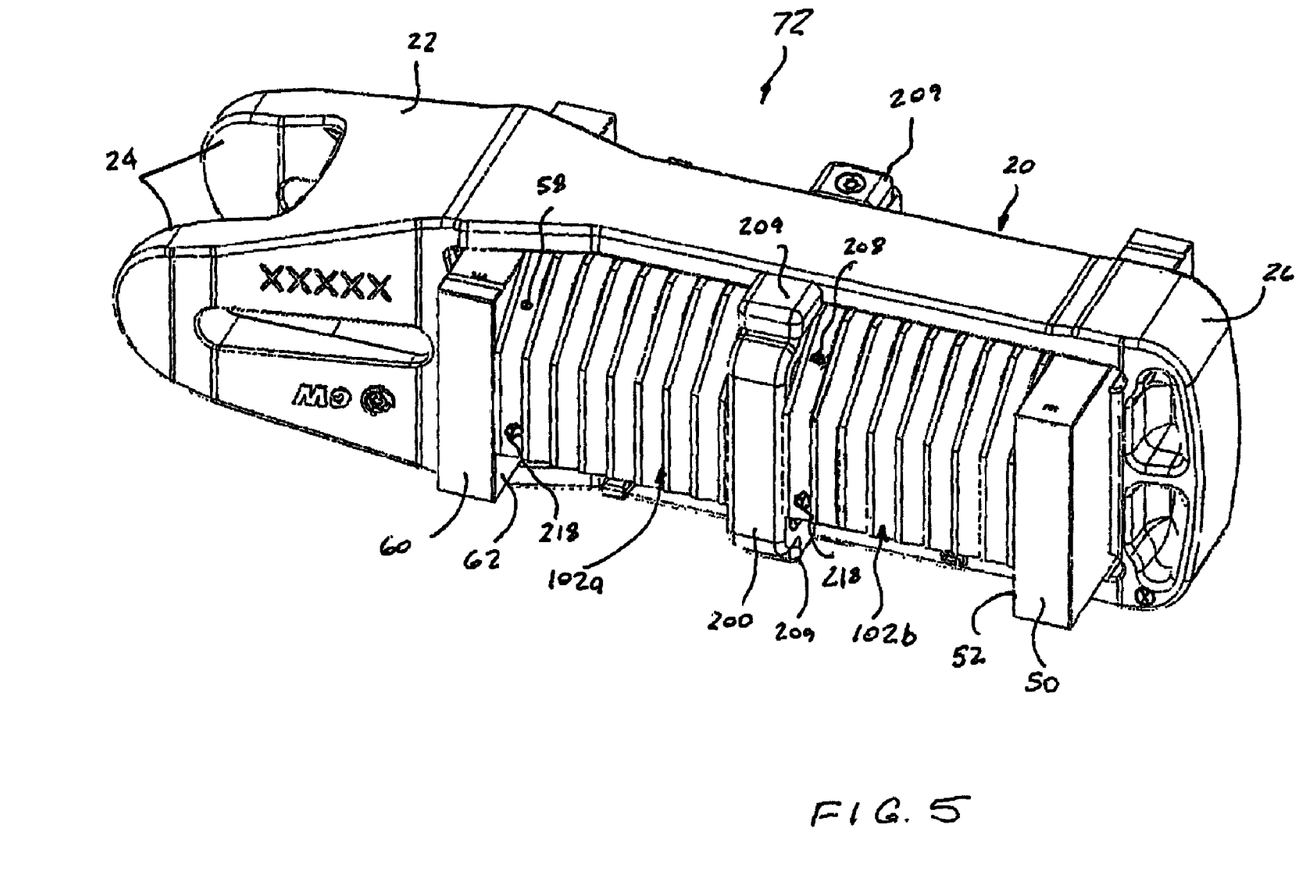
FIG. 5 is an isometric view of a draft gear assembly which is constructed in accordance with another embodiment of the invention.
Figure 6:
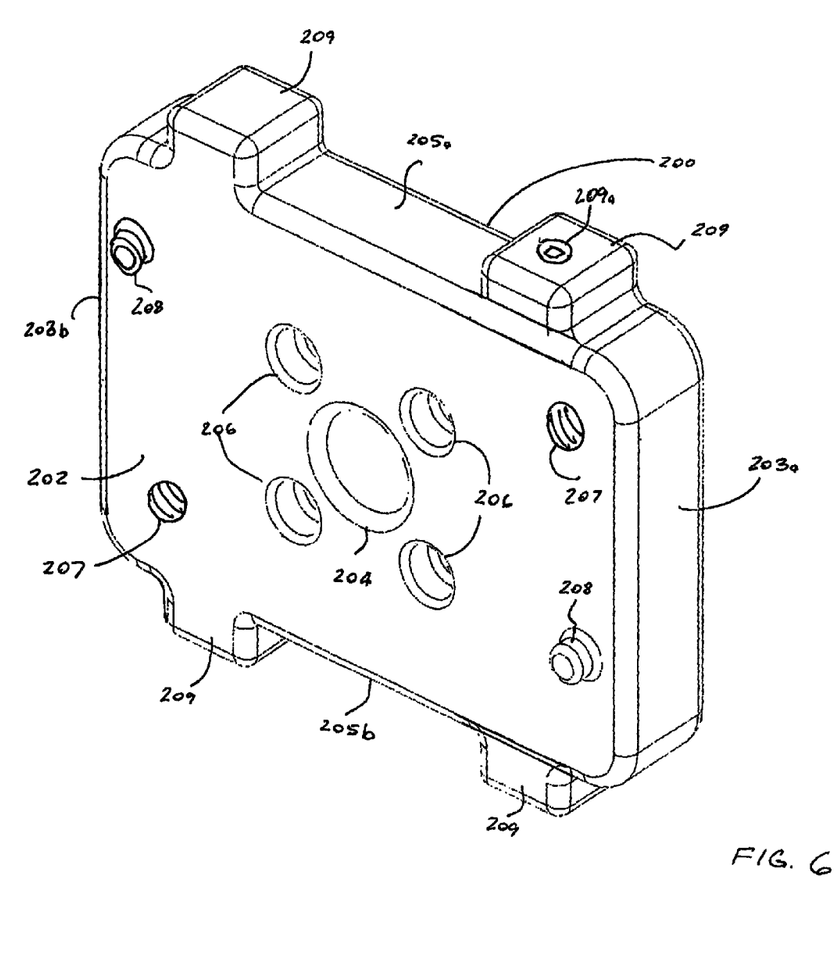
FIG. 6 is an isometric view of a center plate employed with the draft gear assembly of FIG. 5.

Now in reference to FIGS. 5-6 and in accordance with another embodiment of the present invention, there is provided a draft gear assembly, generally designated as 72. The draft gear assembly 72 includes a pair of compressible springs and a center plate 200, best shown in FIG. 6, which is positioned between inner ends of each compressible spring. It is presently preferred to employ a pair of springs 102*a* and 102*b*, which are constructed substantially identical to the spring 102 except for smaller length, although it will be apparent to those skilled in the relevant art that any existing spring arrangements, including conventional coil springs may be employed in the draft gear assembly 72 of FIG. 5, and as such should not be interpreted as a limiting factor of the draft gear assembly 72 of the present invention.

Thus, the present invention is illustrated and described further in combination with a pair of springs 102*a* and 102*b*.

Use of a pair of springs 102*a* and 102*b* reduces their length and, more particularly, simplifies the assembly forming process of each spring. Furthermore, a combination of the pair of springs 102*a* and 102*b* and the center plate 200 provides for novel arrangement of maintaining the axial alignment of each of the pair of compressible elastomeric springs 102*a* and 102*b* along the longitudinal axis 21 of the yoke 20 during cushioning of buff and draft dynamic impact forces.

Such axial alignment maintaining means may include each vertical side edge 203*a*, 203*b* of the center plate 200 being positioned in abutting relationship with the respective inner vertical surface of the center sill 2. Or, each vertical side edge 203*a*, 203*b* of the center plate 200 may be positioned in close proximity to a respective inner vertical surface 4 of the center sill 2 with a conventional wear member (not shown) secured to the each vertical side edge 203*a*, 203*b* and positioned in abutting relationship with the respective inner vertical surface 4 of the center sill 2.

It is presently preferred to utilize the yoke 20 for providing axial alignment of the springs 102*a* and 102*b*. This is archived by adapting the center plate 200 with a pair of flanges 209 at least one of integrally formed with and secured to each horizontal edge 205*a*, 205*b* thereof. The pair of flanges 209 are disposed in a spaced relationship to each other and are further disposed in abutting relationship with respective side edges 36, 46 of a respective one of the top and bottom straps 30 and 40 respectively. A pair of flanges 209 aligned in a vertical direction and further adjacent one side of the yoke 20 may be formed integral with the center plate 200, while the other pair of vertically aligned flanges 209 must be removably attached to the center plate 200, for example by the way of fasteners 209*a*, after the draft gear assembly 72 and the center plate 200 are installed into the yoke 20.

The draft gear assembly 72 further includes means for locating in a bonding-free manner each inner end of each elastomeric compressible spring 102 on a respective face surface 202 of the center plate 200, only one of which is shown in FIGS. 5-6. For the sake of brevity, this is achieved in accordance with various above-described embodiments for locating the outer ends of the spring 102 on the rear follower 50 or the front coupler follower 60. Accordingly, the center plate 200 may be provided with at least one of a central bore 204, a plurality of bores 206 formed in each face surface 202 of the center plate 200 and a pair of projections 208 secured to or formed integrally with each face surface 202 of the center plate 200. Additionally, threaded apertures 207 may be also provided for securing each end plate 150, 190 to the face surface 202 with conventional threaded fasteners (not shown).

Figure 7:
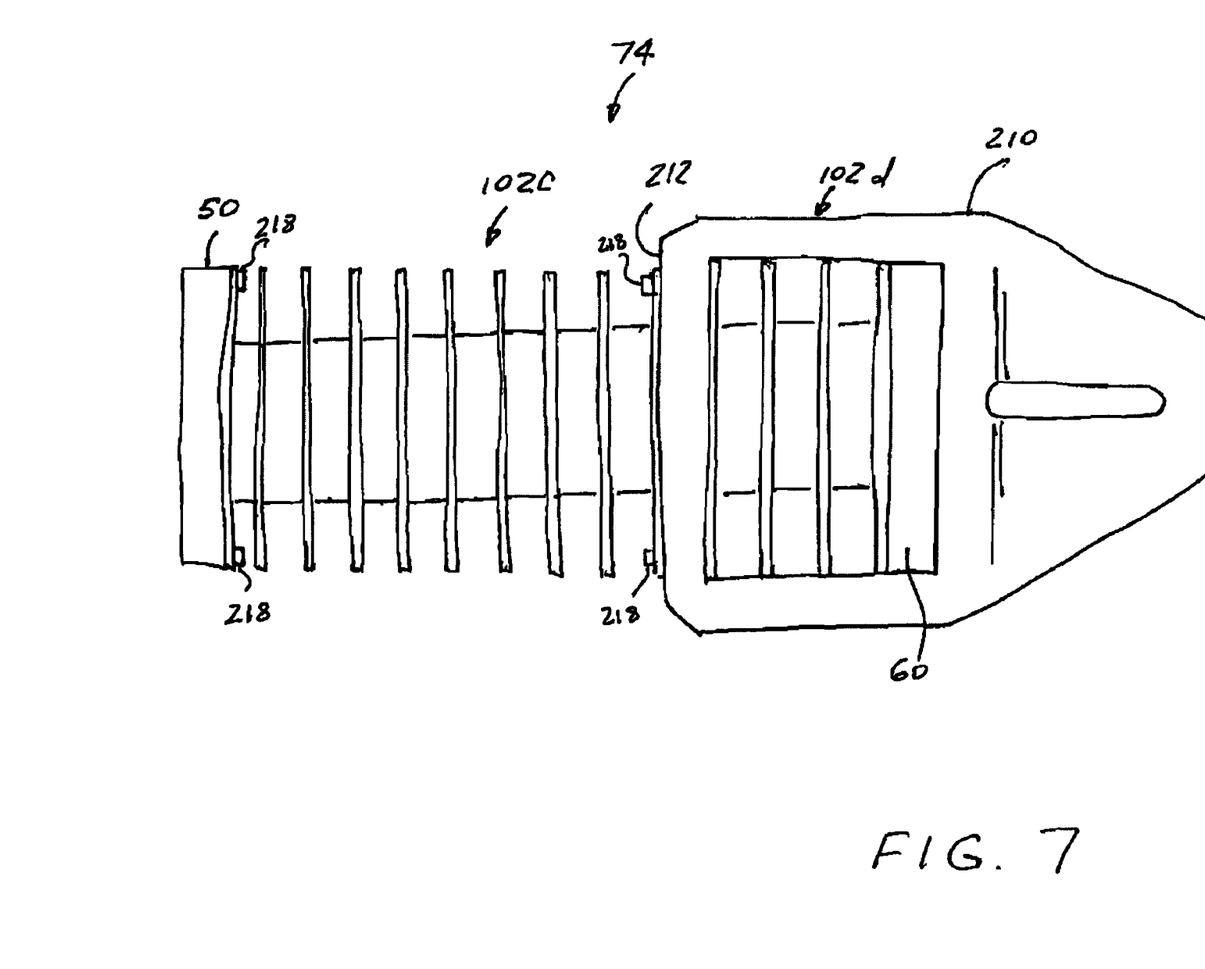
FIG. 7 is an isometric view of a draft gear assembly which is constructed in accordance with yet another embodiment of the invention.
Figure 8:
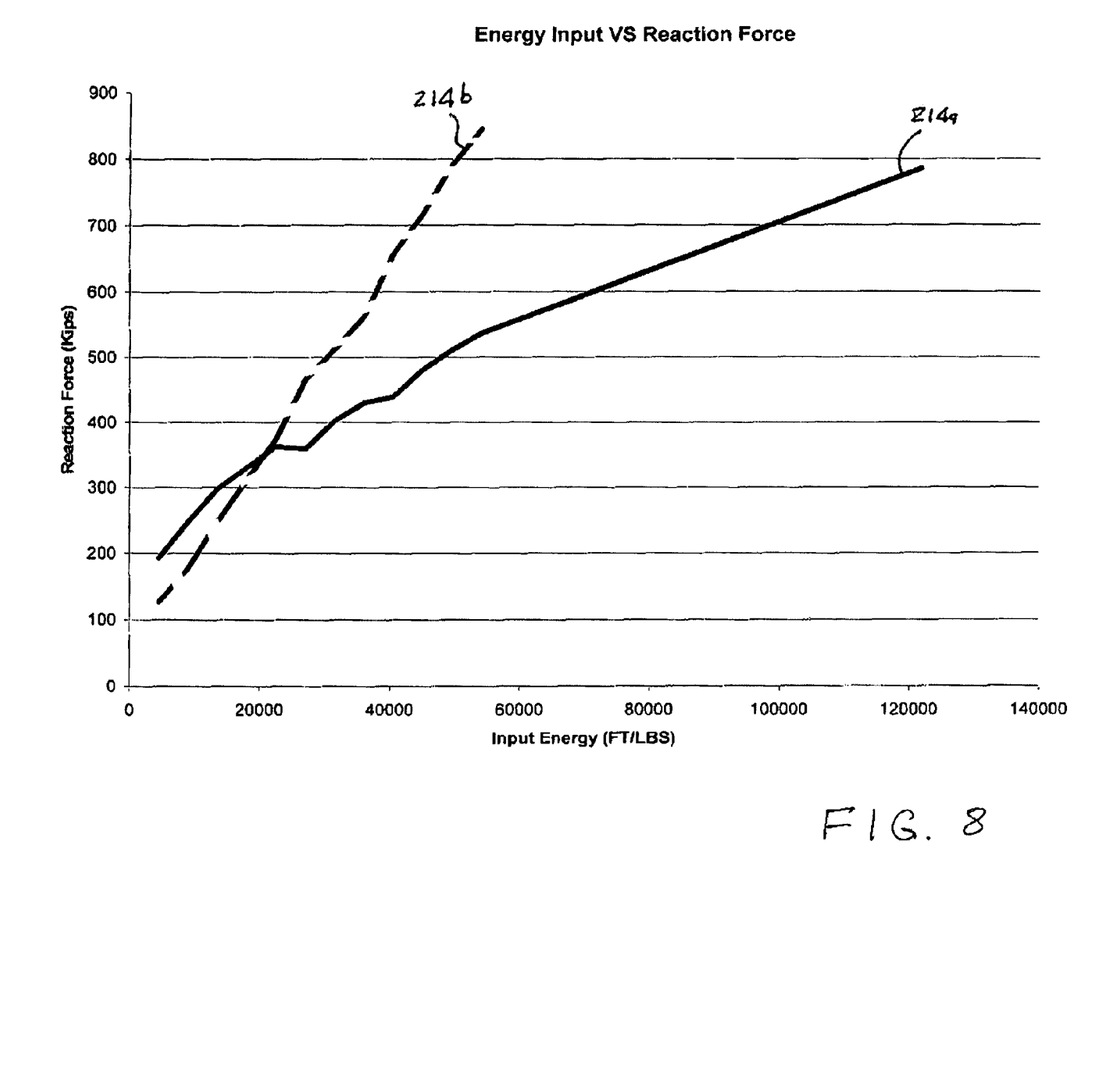
FIG. 8 is a graph illustrating the results of one comparative testing of the draft gear assembly of FIG. 1 with a prior art draft gear assembly of FIGS. 10-11.
Figure 9:
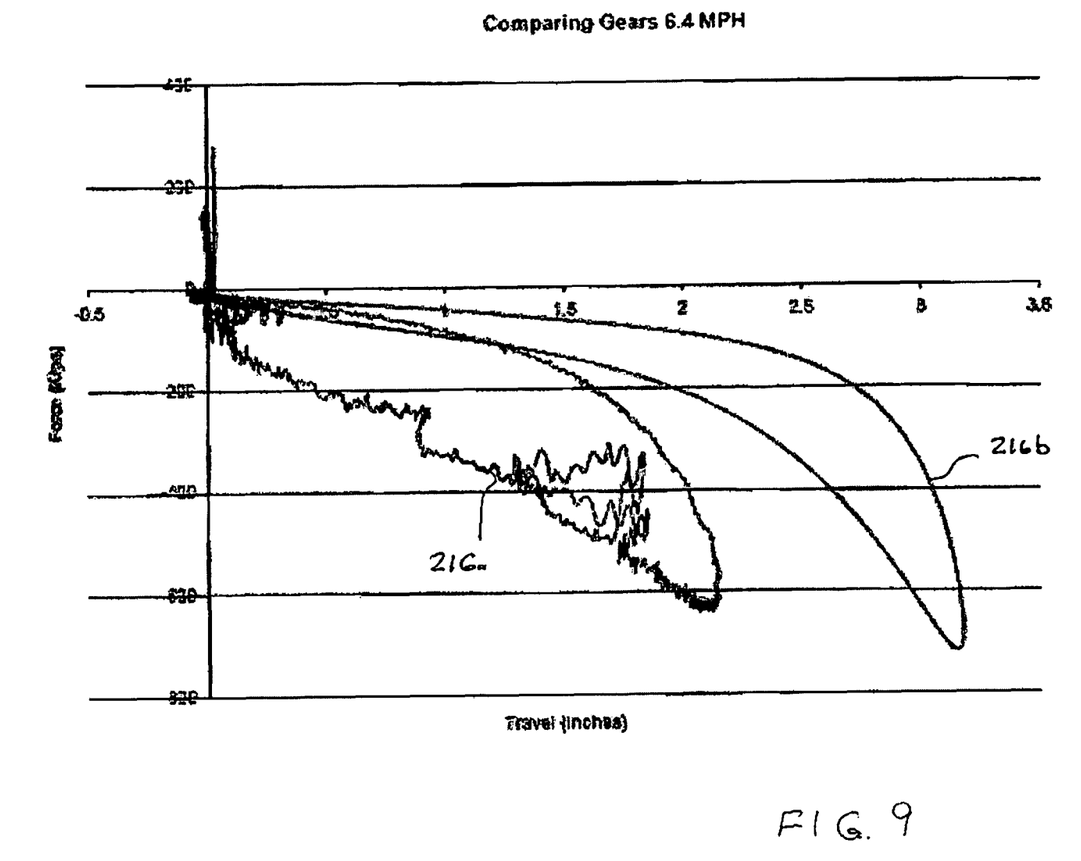
FIG. 9 is a graph illustrating the results of another comparative testing of the draft gear assembly of FIG. 1 with a prior art draft gear assembly of FIGS. 10-11.

In accordance with a further embodiment of the invention of FIG. 7, there is provided a draft gear assembly, generally designated as 74, which is essentially an improvement of the prior art U.S. Pat. No. 6,446,820 of FIGS. 10-11. Such draft gear assembly includes a yoke, a coupler follower, a rear follower, a front resilient member and a back resilient member. The yoke has top and bottom stops. The coupler follower is biased against the yoke top and bottom stops. The draft gear assembly also includes a center rod that extends through the yoke, through the back resilient member and through the rear follower. The Twin Pack design which is advantageous for use in that it eliminates the need for draft gear housing. However, it has been found that during repetitive use, the center rod is not sufficient to maintain axial alignment of the back resilient member resulting in decreased performance and decreased reliability of the draft gear assembly.

The present invention improves this Twin Pack by employing at least one of the front and rear compressible members, and preferably a combination thereof, which are constructed substantially identical to the compressible elastomeric spring 102, by determining the quantity of pads 110 and plates 150, 190 in accordance with the construction of the yoke 210 and securing the rear compressible member, referenced by numeral 102*c*, to the back wall 212 of the yoke 210 and to the rear follower 50 in the above described manner in order to provide for movement of the rear follower 50 toward the front follower 60 during cushioning of the draft dynamic impact forces.

Thus, the present invention eliminates the center rod employed within the Twin Pack advantageously reducing the weight and cost of the draft gear assembly as well as improving its performance during use.

Although the present invention has been shown in terms of the draft gear assemblies mounted within the standard AAR E-type coupler yoke 20, it will be apparent to those skilled in the art, that the present invention may be applied to standard AAR F-type and R-type couplers yokes.

Figure 2:
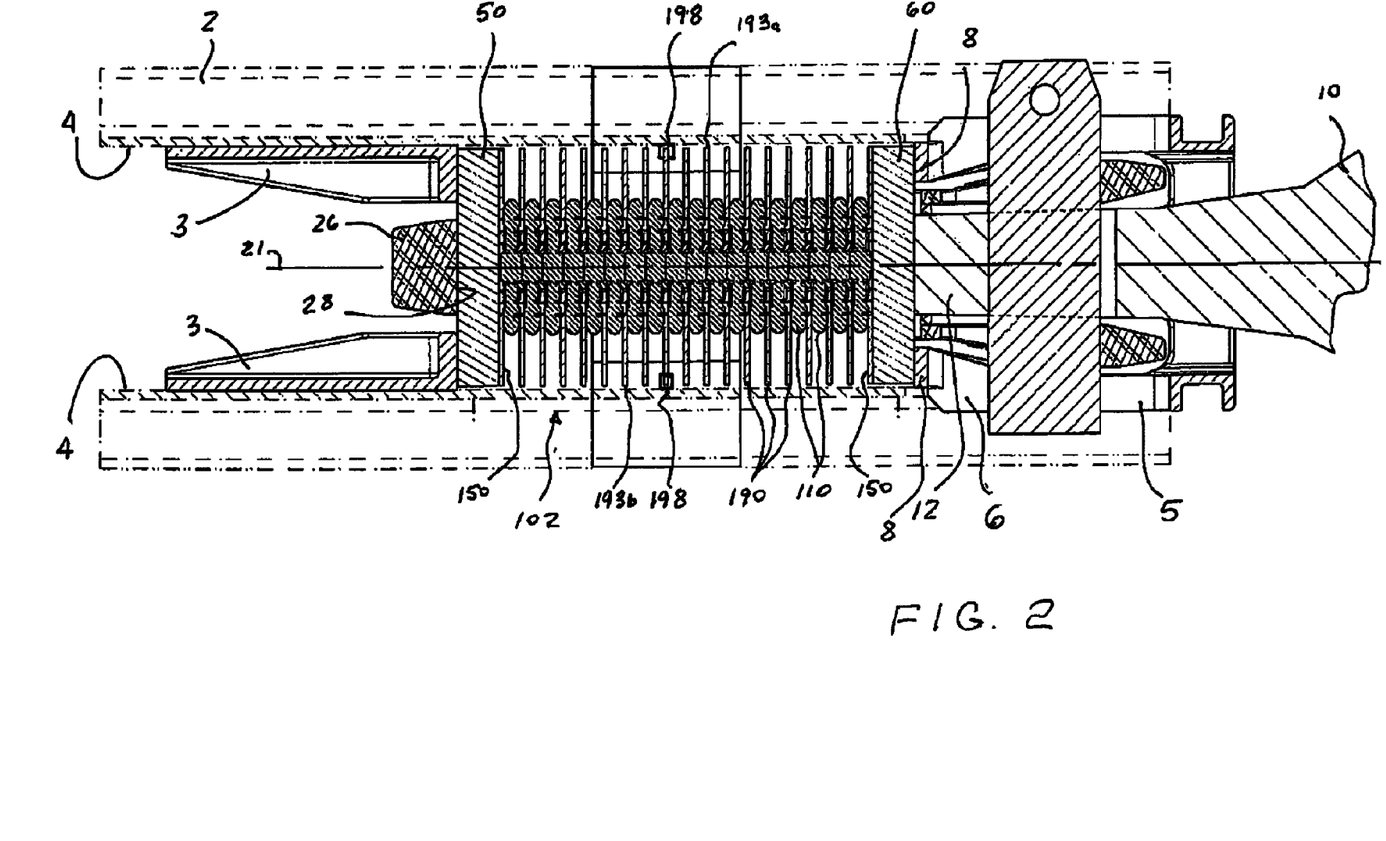
FIG. 2 is a planar cross-sectional of the draft gear assembly of FIG. 1 installed within the center sill.

It will be understood that each of the spring 102-102*d* may be replaced with a plurality of springs 100 best shown in FIGS. 1-2 of the co-pending U.S. Ser. No. 12/150,809 entitled "Compressible Elastomeric Spring" in each of the above described draft gear assemblies 70, 72 or 74. In this embodiment, if required for a specific application, the abutting surfaces of the plate like members 150 may be simply connected or rigidly secured therebetween to maintain the axial alignment of the spring stack. By way of an example only, the outer surface 154 of the plate like member 150 may be provided with a second plurality of projections 160 and the opposed plate like member 150 may be provided with a plurality of apertures 159 sized to respectively receive such second plurality of projections 160. The apertures 159 and projections 160 may be provided with close tolerances to at least significantly reduce or eliminate in its entirety the lateral movement between a pair of such adjacently disposed plate like members 150.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A draft gear assembly for cushioning buff and draft dynamic impact forces encountered during make-up and operation of a railway vehicle, said draft gear assembly comprising:
   (a) an elongated yoke removably mountable within a hollow center sill of a railway vehicle body, said yoke having a yoke head which is adapted to connect to an end of a coupler shank, a butt end axially opposing said yoke head, a pair of elongated substantially parallel spaced-apart top and bottom strap members each having an inner surface, an outer surface, a front end and a rear end, said rear end of each strap member being joined to said butt end of said yoke and said front end of said each strap member being joined to said yoke head;
   (b) a rear follower positioned intermediate said top and said bottom strap members transversely to a longitudinal central axis of said yoke, said rear follower sized to abut a draft gear seat formed within said butt end of said yoke and a pair of rear stops secured to such center sill when said draft gear assembly is in a position to cushion such buff dynamic impact forces;
   (c) a front coupler follower positioned intermediate said top and said bottom strap members transversely to said central axis of said yoke, said front coupler follower sized to abut a pair of front stops formed in a striker casing engaging such center sill when said draft gear assembly is in a position to cushion such draft dynamic impact forces; and
   (d) an elongated compressible elastomeric spring positioned intermediate said front coupler follower and said rear follower in axial alignment with said central axis of said yoke, said compressible elastomeric spring including a stack having a predetermined plurality of elastomeric pads separated by a predetermined plurality of plate like members, each of said predetermined plurality of elastomeric pads and each of said predetermined plurality of plate like members positioned transversely to said central axis of said yoke and laterally within such center sill, wherein said each of said predetermined plurality of elastomeric pads is compressed along said central axis toward said rear follower to cushion such buff dynamic impact forces and is compressed along said central axis toward said front coupler follower to cushion such draft dynamic impact forces, and wherein said each of said predetermined plurality of plate like members moves along said longitudinal axis during cushioning of such buff and draft dynamic impact forces.

2. The draft gear assembly, according to claim 1, wherein said draft gear assembly further includes means for maintaining axial alignment of said compressible elastomeric spring during cushioning of such buff and draft dynamic impact forces.

3. The draft gear assembly, according to claim 2, wherein said axial alignment maintaining means includes:

(a) an axial aperture formed through said each of said predetermined plurality of separator plate like members;
   (b) a predetermined plurality of first prongs at least one of formed integrally with said each of said predetermined plurality of separator plate like members and secured to a first surface thereof, said predetermined plurality of first prongs positioned about a peripheral edge of said axial aperture in each of said plurality of said separator plate like members and extending outwardly at a predetermined angle relative to said first surface for attaching a respective one of said each of said predetermined plurality of separator plate like members to an axial end of one of adjacent pads; and
   (c) a predetermined plurality of second prongs at least one of formed integrally with said each of said predetermined plurality of separator plate like members and secured to a second surface thereof, said predetermined plurality of second prongs positioned about said peripheral edge of said axial aperture in each of said plurality of said separator plate like members and extending outwardly at a predetermined angle relative to said second surface for attaching a respective one of said each of said predetermined plurality of separator plate like members to an axial end of an opposed one of said adjacent pads.

4. The draft gear assembly, according to claim 3, wherein said axial alignment maintaining means further includes a first groove formed within a surface of said axial end of said one adjacent pad and a second groove formed within a surface of said axial end of an opposed one adjacent pad, wherein each of said predetermined plurality of first prongs is received within said first groove, and wherein each of said predetermined plurality of second prongs is received within said second groove.

5. The compressible spring, according to claim 3, wherein said axial alignment maintaining means further includes a pair of projections at least one of formed integrally with a respective axial end of each pad and secured to said surface thereof, and wherein each of said pair of projections extends into a respective axial aperture of an abuttingly positioned separator plate like member and is sized for frictional engagement with a respective predetermined plurality of prongs.

6. The draft gear assembly, according to claim 2, wherein said axial alignment maintaining means includes said each of said predetermined plurality of separator plate like members having each vertical side edge thereof positioned in abutting relationship with a respective inner vertical surface of such center sill.

7. The draft gear assembly, according to claim 2, wherein said axial alignment maintaining means includes said each of said predetermined plurality of separator plate like members having each vertical side edge thereof positioned in close proximity to a respective inner vertical surface of such center sill and a wear member secured to said each vertical side edge and positioned in abutting relationship with such respective inner vertical surface of such center sill.

8. The draft gear assembly, according to claim 2, wherein said axial alignment maintaining means includes a pair of flanges at least one of formed integral with and secured to least one of said predetermined plurality of separator plate like members and extending outwardly beyond a horizontally disposed edge thereof, said pair of flanges are disposed in a spaced relationship to each other and are further disposed in abutting relationship with respective vertical side edges of a respective one of said top and bottom straps.

9. The draft gear assembly, according to claim 1, wherein said draft gear assembly includes a locating means for locating a rear end of said compressible elastomeric spring on an inner surface of said rear follower.

10. The draft gear assembly, according to claim 9, wherein said locating means includes a predetermined plurality of prongs at least one of formed integrally with said rear follower and secured to said inner surface thereof, said predetermined plurality of prongs extending into an exposed axial end of a pad forming said rear end of said compressible elastomeric spring.

11. The draft gear assembly, according to claim 10, wherein said locating means further includes:
   (a) One of an axial bore and axial aperture formed in said inner surface of said rear follower and having said predetermined plurality of prongs positioned about a peripheral edge of said one of said axial bore and axial aperture and extending outwardly at a predetermined angle relative to said inner surface; and
   (b) a projection at least one of formed integrally with said exposed axial end of said pad forming said rear end of said compressible elastomeric spring and abutting said inner surface of said rear follower and secured to said exposed axial end, said projection sized for each of axially extending into said one of said axial bore and axial aperture and for frictional engagement with said predetermined plurality of prongs positioned about said peripheral edge thereof.

12. The draft gear assembly, according to claim 9, wherein said locating means includes:
   (a) an additional pair of plate like members, each of said additional pair of plate like members having a first substantially flat surface thereof abuttingly engaging and attached to an exposed axial end of a pad forming said rear end of said spring and having an opposed second substantially flat surface thereof abuttingly engaging said inner surface of said rear follower;
   (b) a predetermined plurality of prongs at least one of formed integrally with said each of said additional pair of said plate like members and secured to said second surface thereof, said predetermined plurality of prongs extending outwardly at a predetermined angle relative to said second surface thereof;
   (c) one of a groove and a plurality of bores formed in said inner surface of said rear follower in alignment with said predetermined plurality of prongs and in operative engagement therewith.

13. The draft gear assembly, according to claim 9, wherein said locating means includes:
   (a) an additional pair of plate like members, each of said additional pair of plate like members having a first substantially flat surface thereof abuttingly engaging and attached to an exposed axial end of a pad forming said rear end of said spring and having an opposed second substantially flat surface thereof abuttingly engaging said inner surface of said rear follower;
   (b) a predetermined plurality of projections at least one of formed integrally with said each of said additional pair of said plate like members and secured to said second surface thereof; and
   (c) a plurality of bores formed in said inner surface of said rear follower, each aligned with a respective one of said predetermined plurality of projections and sized to operatively receive a respective one of said predetermined plurality of projection therewithin.

14. The draft gear assembly, according to claim 1, wherein said draft gear assembly includes a locating means for locating a front end of said compressible elastomeric spring on an inner surface of said front coupler follower.

15. The draft gear assembly, according to claim 1, wherein said draft gear assembly is sized to fit a 24.625 inch long pocket.

16. A draft gear assembly mountable within a yoke of a railway vehicle for cushioning buff and draft dynamic impact forces encountered during make-up and operation of a railway vehicle, said draft gear assembly comprising:
   (a) a pair of elongated compressible springs positioned intermediate each of a front coupler follower and a rear follower in alignment with said longitudinal axis of such yoke;
   (b) a center plate positioned between inner ends of said elongated compressible springs;
   (c) means for locating each inner end of said elastomeric compressible springs on a respective face surface of said center plate; and
   (d) wherein top and bottom of each of said pair of elongated compressible springs and said center plate are in abutting engagement with at least one inner surface of the yoke.

17. The draft gear assembly, according to claim 16, wherein at least one of said pair of springs includes a stack having a predetermined plurality of elastomeric pads separated by a predetermined plurality of plate like members, each of said predetermined plurality of pads and said predetermined plurality of plate like members positioned transversely to a longitudinal central axis of such yoke and laterally within a center sill, wherein said each of said predetermined plurality of pads is compressed along said central axis toward such rear follower to cushion such buff dynamic impact forces and is compressed along such central axis toward such front coupler follower to cushion such draft dynamic impact forces, and wherein said each of said predetermined plurality of plate like members moves along such central axis during cushioning such buff and draft dynamic impact forces.

18. The draft gear assembly, according to claim 16, wherein said draft gear assembly includes means for maintaining said alignment of each of said pair of elongated compressible springs along such longitudinal axis of such yoke during cushioning of such buff and draft dynamic impact forces.

19. The draft gear assembly, according to claim 18, wherein said alignment maintaining means includes said center plate having each vertical side edge thereof positioned in abutting relationship with a respective inner vertical surface of such center sill.

20. The draft gear assembly, according to claim 18, wherein said alignment maintaining means includes a pair of flanges at least one of integrally formed with and secured to each horizontal edge of said center plate and wherein said pair of flanges are disposed in a spaced relationship to each other and are further disposed in abutting relationship with respective edges of a respective one of top and bottom straps of such yoke.

21. The draft gear assembly, according to claim 16, wherein said draft gear assembly includes means for locating in a bonding-free manner each said inner end of said each elongated compressible spring on a respective face surface of said center plate.

22. A draft gear assembly for use with a railway vehicle having a coupler member, said draft gear assembly positioned within a draft sill of a railway vehicle, such sill having front and rear stops, said draft gear assembly comprising:
   (a) a yoke having a back wall, a top wall extending from said back wall toward a front end of said draft gear assembly and a bottom wall extending from said back wall toward said front end of said draft gear assembly;

(b) a front coupler follower positioned between said back wall of said yoke and said front end of said draft gear assembly, said coupler follower having a pair of stop contact surfaces for contact with draft sill front stops and a coupler bearing surface between such stop contact surfaces;

(c) a front compressible resilient member positioned between said coupler follower and said back wall of said yoke;

(d) a back compressible resilient member positioned between said yoke back wall and a back end of said draft gear assembly;

(e) at least one of said front compressible resilient member and said back compressible resilient member including:
- i. a predetermined plurality of elastomeric pads disposed coaxially and in series with each other, each of said predetermined plurality of pads having a peripheral side surface and a pair of axial ends, each of said pair of axial ends having a substantially flat surface thereof disposed normal to a central axis;
- ii. a predetermined plurality of separator plate like members each disposed between a pair of said pads, each of said predetermined plurality of said separator plate like members having a first substantially flat surface thereof abuttingly engaging a substantially flat end surface of one pad and an opposed second such flat surface thereof abuttingly engaging a substantially flat end surface of an adjacent pad, whereby said predetermined plurality of pads and separator plate like members form in combination a multi-tiered stack having a central longitudinal axis and a predetermined initial height, whereby each of said predetermined plurality of pads compresses and extends along said central axis during cushioning of such buff and draft dynamic impact forces causing movement of each of said predetermined plurality of separator plate like members along said central axis, and
- iii. an axial aperture formed through said each of said predetermined plurality of separator plate like members concentric with said central axis of said stack; and
- iv. means secured to said each of said predetermined plurality of separator plate like members and positioned about a peripheral edge of said axial aperture for mechanically interlocking said each of said predetermined plurality of separator plate like members with each of said pair of pads;

(f) a rear follower positioned rearward of said back resilient member; and (g) means for attaching a rear end of said back resilient member to an inner surface of said rear follower.

23. In combination with a draft gear assembly mountable within a yoke of the railway vehicle for cushioning buff and draft dynamic impact forces encountered during make-up and operation of a railway vehicle, said daft gear assembly including at least one elastomeric compressible spring mounted axially within said yoke a follower block comprising:

(a) an inner surface abuttingly engaging an end of said elastomeric compressible spring;

(b) a rear surface sized for abuttingly engaging at least one of rear stops, front stops and an end of a coupler shank; and (c) a locating means for locating said end of said elastomeric compressible spring on said inner surface of said follower block, said locating means including at least one of an axial bore formed in said inner surface, a plurality of bores disposed in a circular pattern and formed in said inner surface, an axial annular groove formed in said inner surface, a plurality of prongs disposed in a circular pattern on said inner surface and extending outwardly therefrom and a plurality of threaded apertures formed in said inner surface.

* * * * *